(12) United States Patent
Vogt et al.

(10) Patent No.: US 6,775,776 B1
(45) Date of Patent: Aug. 10, 2004

(54) BIOMETRIC-BASED AUTHENTICATION IN A NONVOLATILE MEMORY DEVICE

(75) Inventors: James R. Vogt, El Dorado Hills, CA (US); Robert N. Hasbun, Placerville, CA (US); John P. Brizek, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 09/604,682

(22) Filed: Jun. 27, 2000

(51) Int. Cl.[7] .............................. H04K 1/00; H04L 9/00
(52) U.S. Cl. ........................ 713/186; 713/165; 713/182
(58) Field of Search .......................................... 713/186

(56) References Cited

U.S. PATENT DOCUMENTS

| | | | | |
|---|---|---|---|---|
| 5,812,867 A | * | 9/1998 | Basset | 712/1 |
| 6,003,135 A | * | 12/1999 | Bialick et al. | 713/201 |
| 6,041,410 A | * | 3/2000 | Hsu et al. | 713/186 |
| 6,070,796 A | | 6/2000 | Sirbu | |
| 6,141,756 A | * | 10/2000 | Bright et al. | 713/200 |

FOREIGN PATENT DOCUMENTS

| | | |
|---|---|---|
| WO | WO 00/65770 A | 11/2000 |
| WO | WO 02/01328 A3 | 1/2002 |
| WO | WO 02/01328 A2 | 1/2002 |

* cited by examiner

Primary Examiner—Gregory Morse
Assistant Examiner—Christopher J. Brown
(74) Attorney, Agent, or Firm—Blakely, Sokoloff, Taylor & Zafman LLP

(57) ABSTRACT

A biometric-based security circuit in which the user database, processor, and biometric map generation functions are all located on the same integrated circuit whose secure contents are inaccessible from external to the integrated circuit. Biometric data, such as a fingerprint, retina scan, or voiceprint, is taken from a user requesting access to restricted resources. The biometric data is transferred into the integrated circuit, where it is converted to a biometric map and compared with a database of biometric maps stored in a non-volatile memory in the integrated circuit. The stored maps represent pre-authorized users, and a match triggers the security circuit to send a signal to a host processor authorizing the host processor to permit the requesting user access to the restricted resources. The integrated circuit essentially serves as a write-only memory for the secure data, because the secure data and security functions in the integrated circuit are not directly accessible through any pin or port, and therefore cannot be read or monitored through a dedicated security attack. A second non-volatile memory, accessible from external to the integrated circuit, can also be provided in the integrated circuit for holding non-secure data. This second memory has its own interface port, and is isolated from the security-related functions and memory so that secure and non-secure functions are physically isolated from each other and cannot be modified to overcome that isolation.

25 Claims, 4 Drawing Sheets

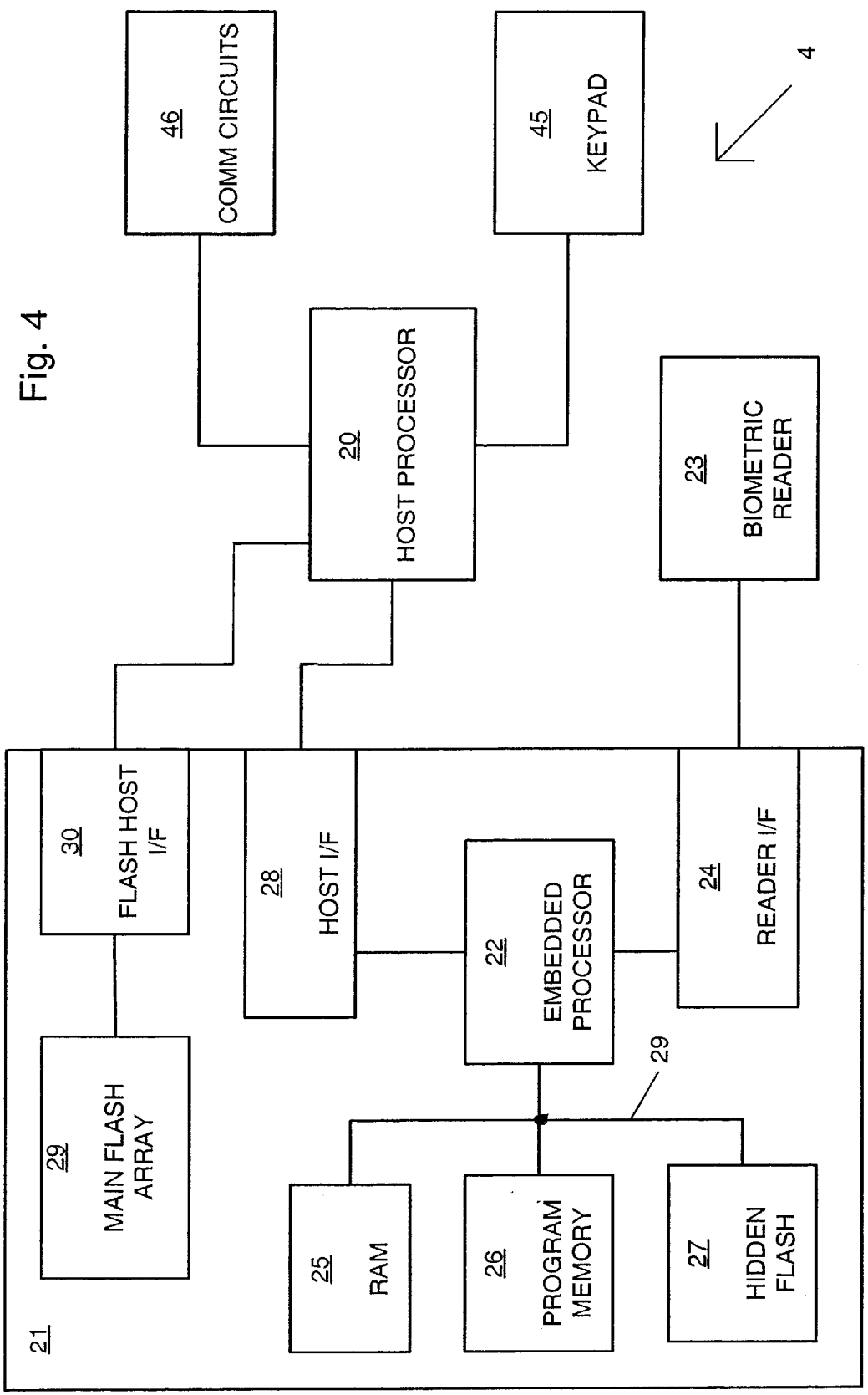

BIOMETRIC-BASED AUTHENTICATION IN A NONVOLATILE MEMORY DEVICE

BACKGROUND OF THE INVENTION

1. Field of the Invention

The invention pertains generally to security systems. In particular, it pertains to an improved security device based on biometric characteristics of the user.

2. Description of the Related Art

Improvements in circuit miniaturization, radio technology, and battery power have led to widespread use of portable devices that access the resources of much larger distributed systems. An example is the use of cellular telephones, which allow subscribers to access the resources of national and global telephone systems with a device they can carry on their person. The typical cell phone allows access to these resources to anyone possessing the cell phone. With larger devices, such as desktop computers that are located in secure areas, basing security on possession is not an issue. But with small, portable devices that are easily lost or stolen, this level of security is inadequate.

A conventional way to address this problem is through the use of passwords. However, password-based security is based entirely on protecting the password. Passwords can be illicitly obtained by unauthorized persons in various ways, such as by observing a person entering the password, electronic monitoring of password entry, or intercepting a new password as it is being delivered to the intended user. Since the user still has the password, the security breach may not be detected until some time after it has been improperly used by the unauthorized person. Another problem is that passwords are sometimes forgotten by the legitimate user, leading to frustration, inconvenience, and taking steps to avoid this problem in ways that may compromise the security of the password.

Another approach is the subscriber interface module (SIM), which combines a password with an artifact such as a machine-readable plastic card containing both secure data and processing capability. Since both the card and the password are necessary for access, this provides an improved level of security over a password-only approach, but it still suffers from many of the same problems.

Problems with these conventional approaches are that passwords can be stolen or forgotten, while artifacts can be lost, stolen, copied, or forged. An improved approach to access control uses biometric data to identify a specific user without the need for passwords or artifacts. Biometric data is data that describes a unique physical characteristic of the user, and which is read directly from the user's person at the time access is requested. Some of the known biometric approaches identify users through fingerprints, retina scans, and voice prints. Each has its own strengths and weaknesses, but all are based on unique physical characteristics of the user that are difficult to duplicate and do not require the user to memorize anything. However, biometric-based security systems also have a weakness. If the biometric data can be obtained, the fingerprint, retina image, voice, etc. can be forged or duplicated and used illicitly to obtain access to the system.

FIG. 1 shows a conventional biometric security system 1. A host system 11 contains a host processor 12, a memory 13, a reader interface 14 to a biometric reader 16, and a general purpose interface 18 to other parts of the system. Memory 13 can include various types of memory, such as random access memory (RAM), read-only memory (ROM), and flash memory. The flash memory is typically used to store valid biometric data on approved users, and can be updated as users are added, removed, or need to have their data modified. This biometric data might be in raw form, such as a digitized image of a fingerprint, but is more likely in a reduced form, representing a coded 'map' of the image that defines the pertinent points of the image in a predefined digital format. At the time access is requested, biometric reader 16 takes the appropriate biometric inputs from the user. For example, reader 16 might be a fingerprint reader, a retina scanner, or a voice print identification device. Biometric reader 16 converts the raw biometric data into a digitized map and sends the map through reader interface 14 to host processor 12, which compares it with the reference map in flash memory. If there is a match, processor 12 will initiate access to the requested resources, typically through general purpose interface 18. This design has at least three major weaknesses. 1) The link between reader 16 and interface 14 can expose the biometric map to monitoring and copying. The illicitly copied map can later be presented to reader interface 14 directly, without the need to duplicate the actual biometric image or data, thereby tricking system 11 into believing it is reading valid data from an authorized user. 2) Host processor 12 typically handles non-secure functions, such as the operational functions of a cell phone. Host processor 12 is therefore subject to hacking and other invasive tampering. It can be falsely directed to provide secure user data through general purpose interface 18, or to store false user data in the flash memory. Either act can permit an unauthorized person to later use the system in the normal manner through reader 16. 3) Flash memory (and therefore secure data) is accessible from outside system 11 through a common bus 15 tying together processor 12, memory 13 and interfaces 14, 18.

These weaknesses also expose the system to destructive tampering, whose goal is to disrupt normal operations rather than obtain unauthorized use of those operations.

BRIEF DESCRIPTION OF THE DRAWINGS

FIG. 4 shows a system of the invention.

DETAILED DESCRIPTION OF THE INVENTION

Figure 2:
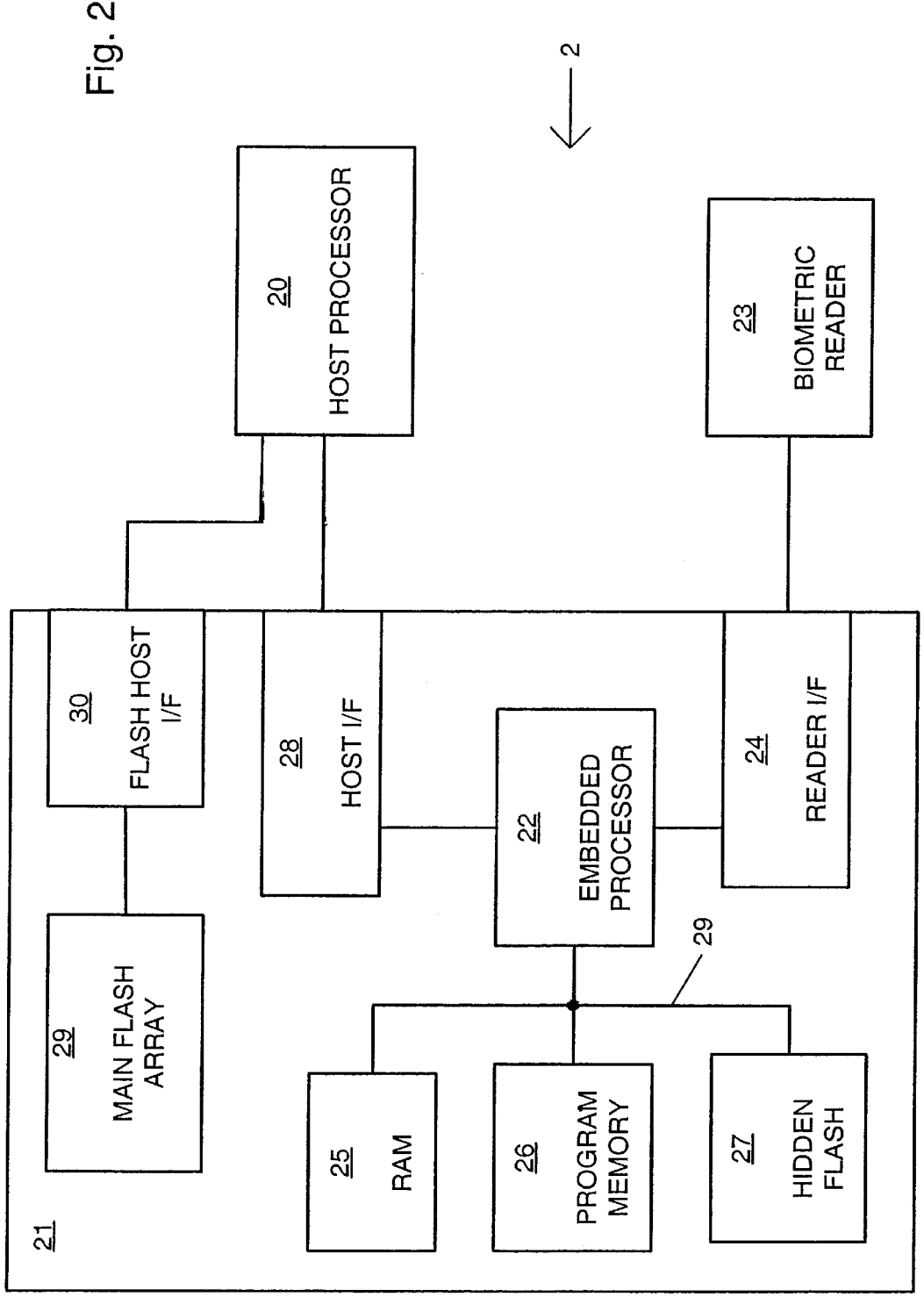
FIG. 2 shows a device of the invention.

The invention provides a self-contained security circuit that maintains secure data in a memory that is inaccessible from outside the security circuit, but which can be used to verify data provided from outside the security circuit. FIG. 2 shows one embodiment of a system 2 of the invention. Host processor 20 can be a non-secure processor, such as the processor in a cell phone that controls overall cell phone operations. Secure circuit 21 is a single integrated circuit that provides a self-contained security environment within system 2, and which cannot be accessed externally without its permission. Any transfer of data into or out of circuit 21 can be controlled by circuit 21. Circuit 21 includes its own embedded processor 22, so called because it is embedded within the perimeters of secure circuit 21. Processor 22 can also control a host interface 28 to host processor 20, and a reader interface 24 to biometric reader 23. Embedded processor 22 can operate with memories 25, 26 and 27 over internal bus 29. Program memory 26 can be programmable read-only memory (PROM) or other non-volatile memory that contains the instructions for operating processor 22. RAM 25 can be used as working space while the processor is in operation, but should not be used to store permanent data, since RAM 25 will lose it contents if device 2's battery become discharged or disconnected. Flash memory 27 can be used for data that will change periodically, but must survive a power loss. Flash memory 27 is where the user-specific data can be stored, such as reference biometric data for each user authorized to use the system. Although RAM 25, program memory 26 and flash memory 27 are shown as three separate types of memory, two or more of them can be consolidated into a single memory type. For example, flash memory can be used in place of RAM 25 and/or program memory 26. Although this disclosure uniformly describes the use of flash memory, other types of writeable non-volatile memory may also be used without departing from the scope of the invention.

Main flash array 29 can provide a separate writeable non-volatile memory that can be used for non-secure data, and is accessible by host processor 20 through flash host interface 30. Although host interface 28 and flash host interface 30 are shown as sharing a common bus, they can also be implemented with completely separate connections. In one embodiment, main flash array 29 can be functionally separate from the security functions in integrated circuit 21. In another embodiment, embedded processor 22 may be able to enable all or part of main flash array 29 when a user is authenticated, and disable all or part of main flash array 29 under other conditions.

Secure circuit 21 is a single integrated circuit that provides a secure boundary surrounding the security functions because the operation of those functions are not accessible from outside circuit 21, and the secure data contained therein cannot be read or written except under specific, limited conditions that it controls. However, for the system to be useful, some type of initial user information must be written into circuit 21. To provide a staring point for entering user information, in one embodiment relevant user data can be initially stored in flash memory 27 under controlled conditions, before device 2 has been placed into operation. For example, this initial setup can establish the biometric map and functionality for a system administrator, who would then be the only one who could subsequently authorize the entry of new user data. Alternately, the first user to input biometric information could automatically be established as the system administrator. Methods of entering initial user information in a security system are well known in the art.

Once user data has been entered into the system, when a potential user tries to use the system by inputting his or her biometric data through reader interface 24, secure circuit 21 can simply give a verified/ not verified indication (and possibly an indication of approved privileges) for that user to host 20 through interface 28. The stored reference data for the user is therefore not exposed, and cannot be read from circuit 21 by any device external to it.

Figure 1:
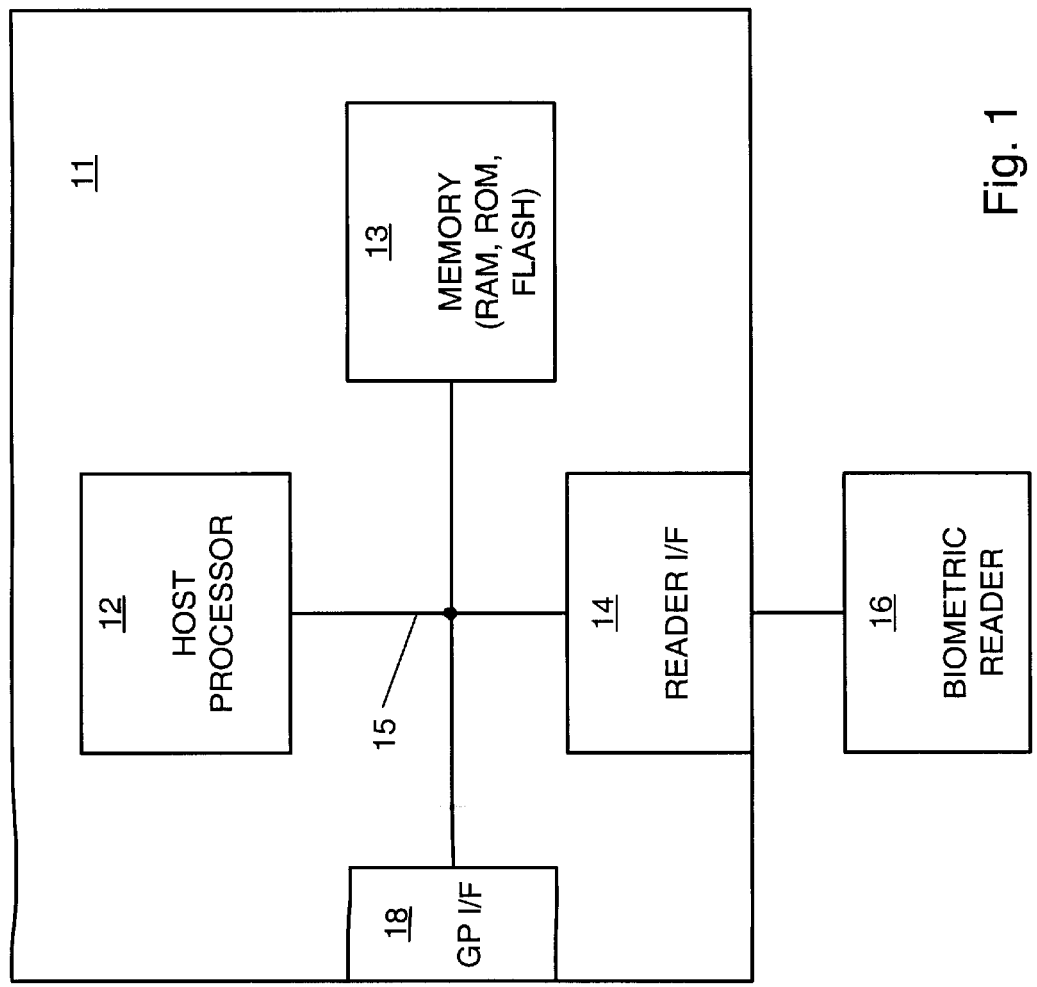
FIG. 1 shows a device of the prior art.

This has significant advantages over the prior art system of FIG. 1. In FIG. 1, some form of secret data, such as a fingerprint map, is stored in flash memory, which may be accessible to other devices through interface 18. In addition, host processor 12 is not secure, and can be tampered with. It can be directed to expose the secret data to external devices through interface 18, and can also be directed to store a forged user file in flash memory. If the control circuits of the flash memory are accessible over the shared bus, forged data can be written directly into the flash memory without the knowledge or participation of host processor 12

By comparison, in the system of FIG. 2, secure data is stored in hidden flash memory 27, which does not share a bus with any external interface and therefore cannot be read by any external device. In addition, embedded processor 22 can be devoted entirely to providing the security functions performed by security circuit 21. Embedded processor 22 can therefore be controlled by non-modifiable code, which is not susceptible to hacking or other tampering with the security functions. All non-secure functions can be performed by host processor 20, which has no access to any security functions or secure data in security circuit 21.

Among its other functions, circuit 21 essentially provides a write-only storage device for security information. After the initial data is written into circuit 21 under controlled conditions, circuit 21 does not permit any of the security data to be read out by external devices, and does not permit further entry of security data except under the control of circuit 21. Since all of circuit 21 is contained in a single integrated circuit, there are no accessible pins or interface connections that would expose the secure data or enable it to be read or modified by an external device. This makes device 2 virtually impervious to security attacks. Not only is the secure data protected, but proper checks on input data can prevent destructive data from being entered into circuit 21.

Figure 3:
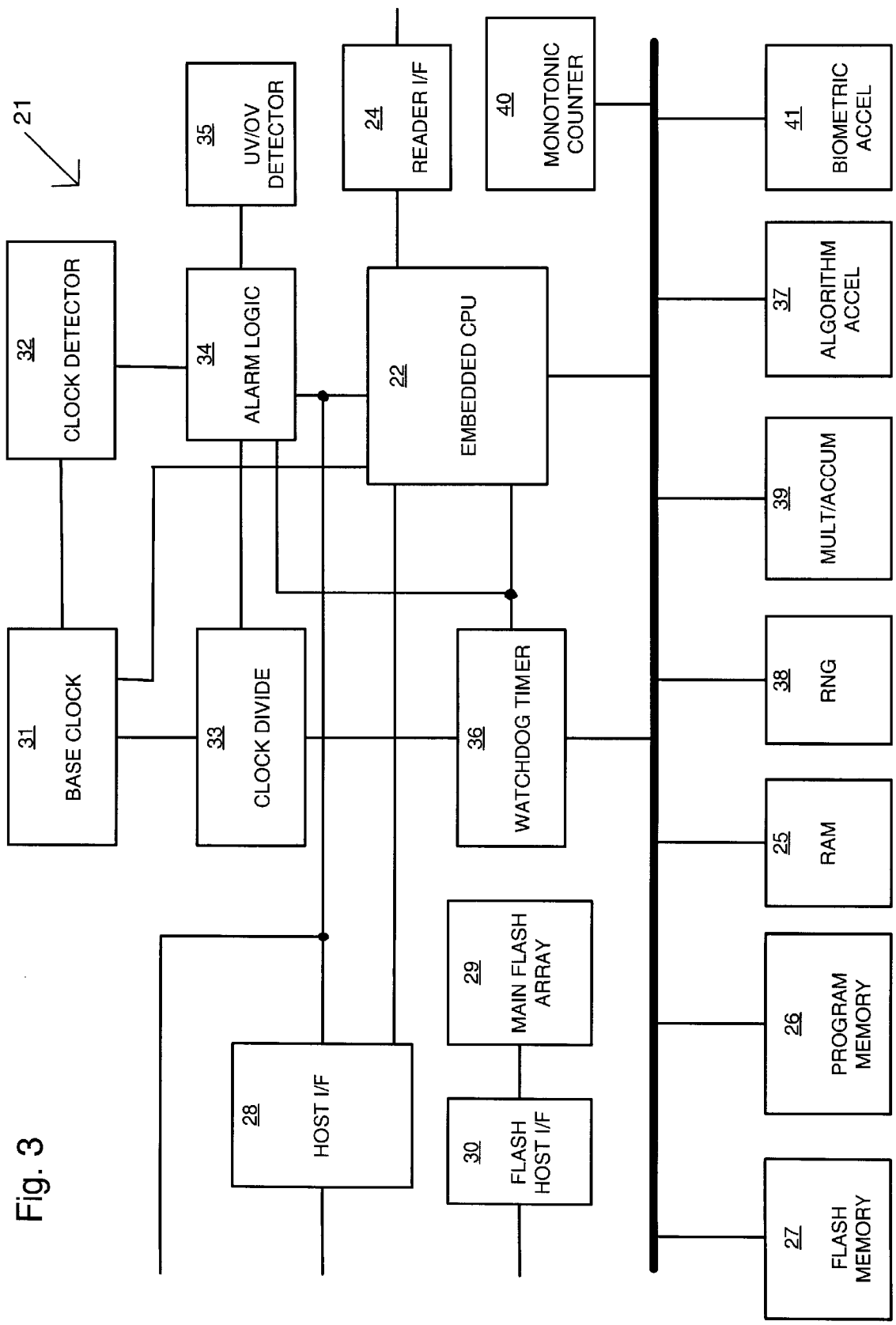
FIG. 3 shows a more detailed view of the device of FIG. 2.

FIG. 3 shows a more detailed view of security circuit 21. Embedded processor 22 interfaces with hidden flash memory 27, program memory 26, RAM 25, random number generator (RNG) 38, multiplier/accumulator 39, algorithm accelerator 37, biometric accelerator 41, monotonic counter 40, and watchdog timer 36 over a common internal bus that is not accessible to external devices. The first three devices are the same as those shown in FIG. 2; the remainder are used to perform security-related functions and are described in more detail below. Also as shown in FIG. 2, processor 22 is coupled to reader interface 24 and host interface 28.

Base clock 31 provides a clock source for circuit 21. One embodiment provides a 70 megahertz (MHz) clock to processor 22. Clock divide circuit 33 can divide the base clock down to a slower rate, to be used as a source clock for watchdog timer 36 and other functions, such as alarm logic 34. Clock detector 32 can determine if base clock 31 is active and within predetermined frequency limits, while undervoltage/overvoltage (UV/OV) detector 35 can monitor the voltage levels in circuit 21. Alarm logic 34 can receive various types of alarm signals from other parts of circuit 21 and provide a consolidated alarm indication to processor 22 and to other circuits.

The functions of circuit 21 are described in more detail below:

Processor

Embedded processor 22 can process commands and perform flash memory management. In one embodiment, processor 22 processes standard SIM commands so that existing legacy software can be used in the system. processor 22 may also perform some of the cryptographic related processing, such as a hashing algorithm or a crypto algorithm. The processor can have enough performance to execute these algorithms in real time without impacting performance. Processor 22 can also incorporate a Memory Management Unit (MMU). The MMU is a highly desirable component in security designs. It can enforce separation of code from data, and can separate the data for one processing context from that of another processing context. This separation can be used to assure that no private data inadvertently becomes mixed with non-private data that is subsequently transmitted out of secure circuit 21.

Host Interface

Host interface 28 can provide an interface to host processor 20 of FIG. 2. This interface can be of various types, such as parallel or serial, high or low speed, etc. To preserve compatibility with existing host devices, host interface 28 can duplicate the interface currently used in existing host systems.

In one embodiment, transfers between host processor 20 and embedded processor 22 can be performed one byte (or other unit of data) at a time with appropriate handshaking signals. In another embodiment, a first-in first-out buffer (FIFO) can be used in interface 28 to buffer multiple bytes, thus allowing either or both processors to operate efficiently in a burst mode.

Host interface 28 can also include other signals, such as one or more pins to transfer alarm information from alarm logic 34, and to receive an external clock signal (not shown) into circuit 21. The operation of host interface 28 can be under the control of embedded processor 22, which may be able to enable or disable all or part of host interface 28 to control the flow of data and other signals being transferred to or from host processor 20.

Program Memory

Program memory 26 contains the instructions for performing the functions that processor 22 performs. To protect the security of the system, program memory 26 can be made non-modifiable while in the system. It can be permanent memory such as PROM, or semi-permanent such as EPROM or flash memory.

Flash Memory

Flash memory 27 is used to store data that may change from time to time, but must survive a power loss. Flash memory is well suited for this purpose in portable devices, since it operates at voltages that are commonly available in portable devices. Flash memory can only be erased in blocks, so sufficient amounts of flash memory are used to assure that when data is changed, the entire block containing the change can be copied into a blank block. The old block is then erased to provide a blank block for the next change.

Although uniformly described as flash memory in this disclosure, other types of non-volatile memory that are programmable in-circuit can also be used and are included within the scope of the invention.

Main flash array 29 can be used for non-secure information, and can be accessible by host processor 20 through flash host interface 30. Although main flash array 29 and its interface 30 are functionally separated from the remainder of circuit 21, placing it on the same integrated circuit as hidden flash 27 can make efficient use of integrated circuit real estate, as well as reduce overall chip count and improve manufacturing efficiencies. Interface 30 may be the same type of interface as host interface 28, and may even connect to a common bus, as shown in FIG. 2. Interfaces 28 and 30 may also be of different types, and/or may have no common connections in the system.

RAM Memory

Random access memory 25 is used as workspace memory while the system is operating. Since the contents of RAM memory are lost when power is removed from the RAM circuits, the data placed in RAM should not include anything that cannot be lost, or that cannot be recovered upon resumption of power.

Random Number Generator

Encryption may be used for communications between secure circuit 21 and other devices. Many types of encryption require the generation of truly random numbers. A hardware generator such as RNG 38 can provide greatly superior performance over software RNG's. Hardware RNG's are known in the art. Some standards require the randomness of the RNG results to be tested in-circuit. This can require approximately 2500 bits of RAM (or alternatively, flash) memory be devoted to the analysis function.

Multiplier/Accumulator

To perform encryption functions, multiplier/accumulator (M/A) 39 can support fast exponentiation and modulo reduction, and can be optimized for those functions. It need not be used for general purpose arithmetic operations, which can be performed in processor 22. Design of the M/A function is closely related to the design of the embedded processor. If processor 22 is a digital signal processor (DSP), then the M/A of the DSP can be used and a separate M/A 39 on the bus may not be necessary.

Algorithm Accelerator

Algorithm accelerator 37 is specific to the cryptographic algorithm being used. This dedicated hardware requires much less processing time to perform the algorithm than will a processor. Algorithm accelerator 37 is separate in function and implementation from M/A 39. The M/A can be used to accelerate multiplication and exponentiation operations that are used in asymmetrical algorithms such as public key encryption. The algorithm accelerator speeds up symmetrical algorithms that are frequently employed to provide message privacy. Both the need for, and the specific design of, M/A 39 and accelerator 37 will depend on the particular cryptographic algorithm(s) to be employed in the circuit. RNG 38, M/A 39, and algorithm accelerator 37 can also be used to authenticate and encrypt data traveling between circuit 21 and biometric reader 23 in either direction.

Biometric Accelerator

Biometric accelerator 41 can be similar in function to algorithm accelerator 37, except its purpose is to accelerate processing of the biometric data. Conversion of raw biometric data into a biometric map may involve intensive, repetitive processing, which can best be performed by a hardware accelerator specifically designed for the particular processing required.

Undervoltage/Overvoltage Detection

Undervoltage/Overvoltage (UV/OV) detector 35 can protect the system from a class of cryptographic attacks based on varying the voltage inputs. These attacks drive the supply voltage outside the specified operating range for the device in an attempt to force the subject under attack to mis-operate so that plain text or keys are exposed. UV/OV 35 can detect these out-of-range voltage conditions and alert processor 22, which can take action to stop operating before the secret information can be exposed. This also protects the system against an uncontrolled crash in the event the power supplies degrade or fail. In one embodiment, comparators are used to monitor the input voltage against reference voltages. The reference voltages are set using precision resistors as a voltage divider to bias an op amp.

Clock

Base clock 31 can provide a clock source for circuit 21. In one embodiment, base clock 31 is an internal clock operating at 70 MHz. It can be fed directly to processor 22 as a processor clock. It can also be divided down to lower frequencies by clock divide circuit 33 to operate such things as watchdog timer 36 and alarm logic 34. The use of an internal clock rather than an external clock prevents a dedicated attacker from manipulating the circuit by controlling the clock.

Clock Detector

Clock detector 32 can monitor the frequency of the clock signal. If the clock frequency is outside a preset range, an alarm can be generated so that the processor can take appropriate action to shut down or otherwise protect private information. This detector is useful primarily when an external clock source is used.

Watchdog Timer

Watchdog timer 36 can monitor program execution and data transfers. The program can be designed to pre-load the timer with predetermined values, either at periodic intervals or at the start of a particular routine. If the program operates as expected, the timer will always be reloaded or stopped before time expires. If the timer expires, it indicates that an unexpected change has occurred in program execution and an alarm can be generated. Watchdog timer 36 can also be used to monitor events that depend on external operations, such as data transfers between circuit 21 and another device. Because watchdog timers normally measure time in milliseconds rather than microseconds or nanoseconds, base clock 31 can be reduced to a lower frequency clock to provide a more useful time base for the watchdog timer.

Alarm Logic

An alarm system is critical to any security design because it protects against failures or malicious attacks by alerting the system to take additional protective measures. Alarm logic 34 provides a consolidation point for the various alarms that can be generated, and sends appropriate signals to processor 22 so that it can take action to prevent loss of private information or other data. As shown in FIG. 3, alarm signals can also be sent to host interface 28, and from there to the host system, and can also be provided directly to external devices.

In addition to the alarms described in the previous paragraphs, alarm logic 34 can also process the following alarms:

1) Bad key alarm—This monitors cryptographic keys and generates an alarm when a bad key is encountered. The specific identification of bad keys is unique for each algorithm.

2) Manual key entry alarm—The monitors the veracity of keys that are manually loaded. Manually loaded keys should have an error detection code, such as a parity code, or should use duplicate entries in order to verify the accuracy of the entered keys.

3) Randomizer alarm—This tests the output of RNG 38 and verifies that the output is statistically random. Various known tests can be used to perform this verification, both at power up and at various points during operation.

4) Software/firmware alarm—On power up, the program can be tested to verify that it has not been corrupted. This can be done by an Error Detection Code (EDC) or by a digital signature applied to the program contents.

5) Self Tests—Various system self tests can be performed on power up, after a reset, or when commanded by the host. Self tests can include an instruction set test, a flash memory test, a RAM test, and known-answer test with M/A 39.

Monotonic Counter

Monotonic counter 40 is shown connected to the internal bus, but can also be implemented with other connections, or can be implemented in software or firmware. A monotonic counter is a counter that can only increment (or only decrement) and never repeats a number, implying that it must never be allowed to reset or cycle back to its starting count. Monotonic counter 40 can be used to provide a unique identification number for every communication to/from circuit 21. This prevents a communication from being recorded and later played back to simulate a legitimate communication. Since the counter value used with the recorded communication would no longer match the current counter value, this type of security attack can be detected as soon as the recorded communication is transmitted to circuit 21. Additional security can be achieved by having the counter increment in a non-linear fashion, so that the current counter value cannot be guessed simply by counting the number of communications that have taken place since the recorded transmission.

Although the security contents of circuit 21 are generally inaccessible and unmodifiable from external to the circuit, in one embodiment the program of embedded CPU 22 can be modified or replaced by downloading a new program into secure circuit 21. The downloaded program can be authenticated by embedded CPU 22 before being accepted and used, to prevent an illicit program from being inserted to compromise the security of the system. The downloading can take place through host interface 28, or can take place through a separate security interface (not shown).

In one embodiment, an authorized user may be granted direct access to the contents of hidden flash memory 27, if that user is first authenticated.

System Operation

Flash memory 27 can be used to store the secure biometric map that identifies each authorized user. Whenever a user requests access to the system, his or her biometric data can be read by biometric reader 23 and provided through reader interface 24. This biometric data can be compared to the stored biometric data of all authorized users in the system. If a match is found, a 'user verified' message can be sent to host processor 20 through host interface 28, permitting host processor 20 to initiate the requested operation. In one embodiment, the host is also told which functions or resources this particular user is authorized to use.

Once secure user data is placed in a file in hidden flash memory 27, that user data is inaccessible to any device outside the perimeters of secure circuit 21. Bus 29 that connects to hidden flash memory 27 does not have an external port. Embedded processor 22 is the only device that is coupled to both hidden flash memory 27 and the external world, and the operation of processor 22 can be restricted by placing its operating code in PROM so that the code cannot be modified to redirect processor 22's operations. Alternatively, processor 22 can permit new operating code to be downloaded, provided processor 22 authenticates the new code before accepting it or using it.

Most biometric readers do not transmit the raw biometric data for comparison purposes, but rather convert it into data that focuses on the most relevant parameters. For example, the digitized image of a fingerprint may require several thousand bytes of data. But fingerprint technology focuses on the location, orientation and nature of specific features of a fingerprint, which can be reduced down to a few hundred bytes. These few hundred bytes define a fingerprint 'map', and it is this map that is stored and later used as a reference for comparison purposes. When a user requests access to the system, his recently-input fingerprint is also converted to a map, which is then compared with the maps currently stored in hidden flash memory 47 to determine if the user is authorized.

In conventional systems, the user's fingerprint map is generated in biometric reader 23. However, public policy concerning privacy issues treats this data as extremely sensitive information, and generation of the map should take place only in a secure environment. Depending on the construction of the system, the link between biometric reader 23 and reader interface 24 may be subject to monitoring, and the fingerprint map should not appear on this link. For that reason, one embodiment of the invention generates biometric maps within circuit 21, using processor 22 and the memories on bus 29 as needed. The resulting map is therefore never exposed to any external interface of secure circuit 21, and cannot be read by any external device.

Other types of biometric data can be treated similarly. Voice data can be converted into relevant frequency, amplitude, and time components, which can then be processed through an algorithm to produce a voice map of the speaker's voice. A retina scan can produce an image of the user's eye, which is then processed to generate a retina map that describes the characteristics of the user's retina. Although each technology has its own identifying characteristics, each can be processed by a system of the invention by following the steps of: 1) registering a user by reading the relevant biometric data, converting that data to a map, and storing the map in non-volatile memory, 2) identifying an authorized user by reading the requestor's relevant biometric data, converting it to a map, and comparing the map with the previously-stored maps, 3) if a match is found, sending a message to a host system designating the requester as an authorized user, and in some embodiments identifying the scope of that user's access to the system, 4) if a match is not found, sending a message to the host system that the requestor is not an authorized user.

FIG. 4 shows a specific system-level embodiment, in which the aforementioned security system is placed into a cellular telephone 4 having a fingerprint reader 23 integrated into cell phone 4 to identify the user. The reader can be conveniently placed on the cell phone to read the fingerprint of a person holding the phone. The user can initially be registered in the phone by a pre-authorized system administrator, who directs the system to enter the new user's thumbprint data into its database of authorized users. The first person to enter their print into the phone might be automatically designated as a system administrator. Alternately, a separate facility can be provided to create the fingerprint map, which is then downloaded into the system through a designated channel.

Regardless of how the database is loaded, a user requesting access can place their thumbprint over fingerprint reader 23, which will digitize the image and send it through user interface 24 to processor 22. Processor 22 can then generate the fingerprint map for that image, and compare it with the one or more maps stored in non-volatile memory 27. Each stored map can also have an associated list of resources that that user is authorized to use. If the comparison is successful (i.e., if the map matches one stored in memory), processor 22 can send a signal to host processor 20 indicating the requestor is an authorized user, and indicating which resources that user is permitted to use. Host processor 20 can then enable the requested services, such as accepting a telephone number from the cell phone keypad 45 and using communications circuits 46 to transmit that number over the cell phone network.

In a system designed for voice print identification, the existing microphone in the cell phone can be used for the biometric reader. Some form of random word prompting might be necessary to avoid the problem of a recorded voice being used to improperly gain access to the system.

The invention can be implemented in hardware and/or as a method. The invention can also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

We claim:

1. An apparatus, comprising:
an integrated circuit including:
    a first processor;
    a first interface coupled to the first processor to communicate with a second processor external to the integrated circuit;
    a first non-volatile memory decoupled from the first interface and coupled to the first processor to store first biometric data identifying at least one authorized user, and having contents that are unreadable external to the integrated circuit;
    a second interface coupled to the first processor to input second biometric data from a biometric reader;
    a third interface; and
    a second non-volatile memory, coupled to the third interface and decoupled from the first processor, first interface, second interface, and first non-volatile memory, having contents that are accessible external to the apparatus through the third interface.

2. The apparatus of claim 1, wherein the first non-volatile memory is a flash memory.

3. The apparatus of claim 1, wherein the second non-volatile memory is a flash memory.

4. The apparatus of claim 1, wherein the biometric reader is a fingerprint reader.

5. The apparatus of claim 1, wherein:
the first biometric data includes a first biometric map; and
the integrated circuit contains includes code to cause the first processor to convert the second biometric data to a second biometric map.

6. The apparatus of claim 5, wherein the integrated circuit contains code to cause the first processor to perform a comparison between the second biometric map and the first biometric map.

7. The apparatus of claim 6, wherein:
the integrated circuit contains includes code to cause the first processor to send a verification signal through the first interface if a match is found in the comparison; and
the integrated circuit contains code to cause the first processor to send a non-verification signal through the first interface if a match is not found in the comparison.

8. The apparatus of claim 1, wherein the integrated circuit contains code to cause the first processor to authenticate a program downloaded into the integrated circuit.

9. A system, comprising:
a host processor;
a biometric reader;
an integrated circuit coupled to the biometric reader and host processor including:
    a first processor;
    a first interface coupled to the first processor and the host processor;
    a first non-volatile memory decoupled from the first interface and coupled to the first processor to store first biometric data identifying at least one authorized user, and having contents that are unreadable external to the integrated circuit;

a second interface coupled to the first processor and the biometric reader to input second biometric data;

a third interface; and a second non-volatile memory, coupled to the host processor through the third interface and decoupled from the first processor, first interface, second interface, and first non-volatile memory, having contents that are accessible external to the apparatus through the third interface.

10. The system of claim 9, wherein:

the first biometric data includes a first biometric map; and the integrated circuit contains code to cause the first processor to convert the second biometric data to a second biometric map.

11. The system of claim 10, wherein the integrated circuit contains code to cause the first processor to perform a comparison between the second biometric map and the first biometric map.

12. The system of claim 10, wherein:

the integrated circuit contains code to cause the first processor to send a verification signal through the first interface if a match is found in the comparison; and the integrated circuit contains code to cause the first processor to send a non-verification signal through the first interface if a match is not found in the comparison.

13. The system of claim 9, wherein the integrated circuit contains code to cause the first processor to authenticate a program downloaded into the integrated circuit.

14. An integrated circuit, comprising:

a secure component to manage restricted data so that the restricted data is not accessible external to the integrated circuit; and a non-secure component to manage unrestricted data so that the unrestricted data is accessible external to the integrated circuit, the non-secure component including:
 a first processor,
 a first interface coupled to the first processor to receive biometric data;
 a first non-volatile memory coupled to the first interface and the first processor to store biometric data identifying at least one authorized user, and having contents that are unreadable external to the security circuit;
 a second interface; and
 a second non-volatile memory, coupled to the second interface and decoupled from the first processor, first interface, and first non-volatile memory, having contents that are accessible external to the integrated circuit through the second interface.

15. The integrated circuit of claim 14, further comprising a third interface coupled to the first processor to communicate with a second processor external to the integrated circuit.

16. The integrated circuit of claim 14, wherein the first nonvolatile memory and the second non-volatile memory each comprise a flash memory.

17. A system comprising:

biometric reader; and a security circuit including:
 a first processor;
 a first interface coupled to the first processor to input biometric data;
 a first non-volatile memory coupled to the first processor to store second biometric data identifying at least one authorized user, and having contents that are unreadable external to the security circuit;
 a second interface coupled to the first processor to communicate with the second processor;
 a third interface coupled to the first processor; and
 a second non-volatile memory coupled, to the third interface and decoupled from the first processor, first interface, second interface and first non-volatile memory, having contents that are accessible external to the security circuit through the second interface and a second processor coupled to the security circuit.

18. A system comprising:

a first processor; and a security circuit, coupled to the first processor, including:
 a first interface coupled to communicate with the first processor;
 a first non-volatile memory decoupled from the first interface to store first biometric data identifying at least one authorized user, and having contents that are unreadable external to the security circuit;
 a second processor coupled to the first interface and the first non-volatile memory;
 a second interface coupled to the second processor to input second biometric data; and
 a second non-volatile memory, coupled to a third interface and decoupled from the second processor, first interface, second interface, and first non-volatile memory, and having contents that are accessible external to the security circuit through the third interface.

19. The system of claim 18, wherein the first non-volatile memory is a flash memory.

20. The system of claim 18, wherein the second nonvolatile memory is a flash memory.

21. The system of claim 18, further comprising a biometric reader.

22. The system of claim 18, wherein the first biometric data includes a first biometric map; and the security circuit includes code to cause the second processor to convert the second biometric data to a second biometric map.

23. The system of claim 18, wherein the second processor is to perform a comparison between the second biometric map and the first biometric map.

24. The system of claim 23, wherein the security circuit includes code to cause the second processor to transmit a verification signal through the first interface if a match is found in the comparison, and code to cause the second processor to transmit a non-verification signal through the first interface if a match is not found in the comparison.

25. The system of claim 18, wherein the security circuit includes code to cause the second processor to authenticate a program downloaded into the security circuit.

* * * * *